July 11, 1967  MASAHIKO INOUE  3,330,599
SEAT FOR A VEHICLE EQUIPPED WITH SAFETY BELTS
Filed March 7, 1966
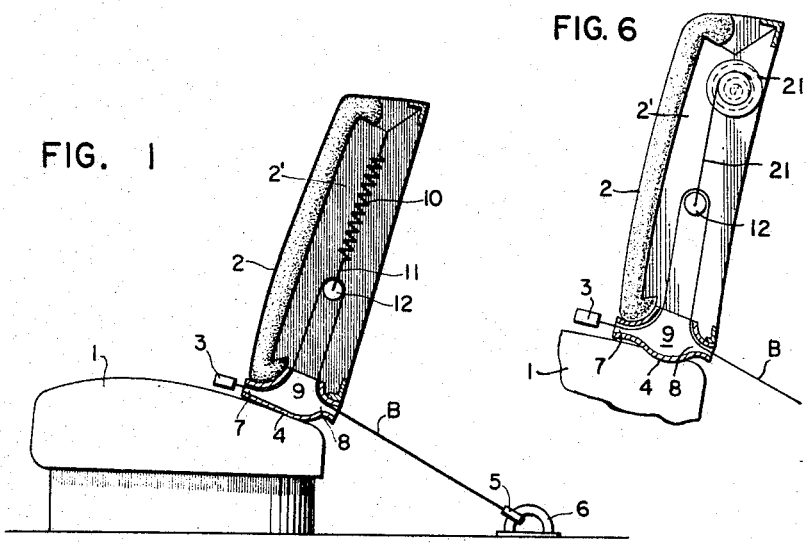
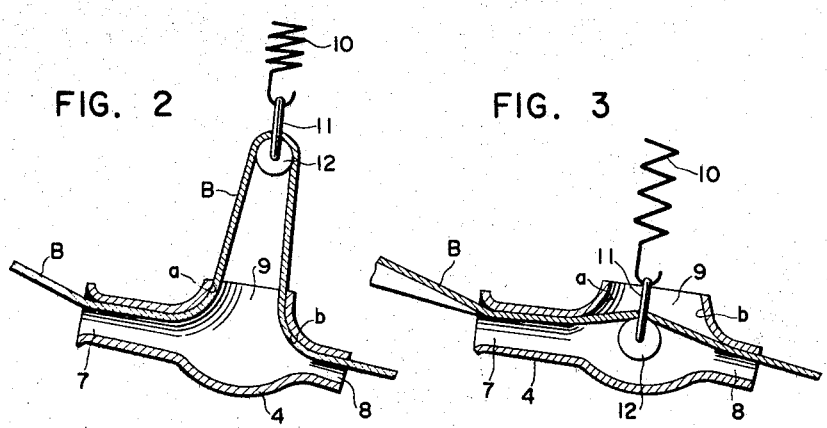
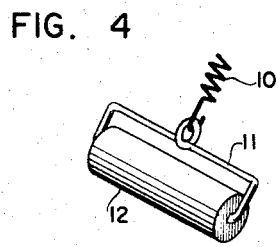
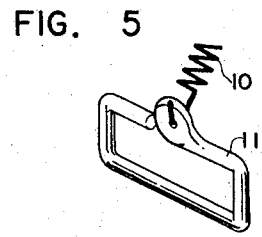

United States Patent Office 3,330,599
Patented July 11, 1967

3,330,599
SEAT FOR A VEHICLE EQUIPPED WITH
SAFETY BELTS
Masahiko Inoue, Toyota, Japan, assignor to Toyota Motor Company, Limited, Toyota, Japan
Filed Mar. 7, 1966, Ser. No. 532,151
Claims priority, application Japan, Mar. 27, 1965, 40/17,904
1 Claim. (Cl. 297—388)

This invention relates to a seat for a vehicle equipped with a safety belt, so-called seat belt, particularly to a safety belt stowing device for such safety belt.

With respect to the seat equipped with the safety belt, it is undesirable to leave the front half portion of the safety belt put on the seat in random condition when it is not in use, for it will not only be a hindrance to the seater, but also it is liable to considerably spoil the appearance of the seat. In view of the above, it has been proposed to provide a container or receptable attached to the rear side of the backrest, in which container the remaining portion of the belt is stowed. The provision of such a container secured to the rear side of the backrest, results in an increase of the width of the backrest and it not only obstructs the free movement of the passengers seated on the rear seat, but also it is liable to spoil the appearance of the rear seat and be unsafe for the passengers in the rear seat.

One object of the present invention is to provide a seat for the vehicle, wherein the front half portion of the safety belt is completely stowed in an idle space within the backrest without providing any rigid container attached to the rear side of the backrest, so that the seat is always kept cleared up when the belt is not in use.

Another object of the present invention is to provide a seat for a vehicle equipped with a safety belt of which the front end has a buckle or the like and the rear end is anchored to a rigid member of the body of the vehicle, wherein the front half portion of the belt is automatically pulled in by the action of a spring and stowed in an idle space within the backrest.

With the above mentioned objects in view, according to the present invention, a guide member for the safety belt is provided between the rear part of the seat and the backrest, said guide member being adapted to guide the belt at the intermediate portion thereof in the transverse direction, and means adapted to pickup and pull in said intermediate portion of the belt transversely to the direction of the belt by the action of a relatively weak spring, having its strength enough to pull in the front half of the belt, so that when not in use the pulled-in portion of the belt formed into a loop is stowed in an idle space directed substantially transversely to the direction of the belt.

The above and other objects, features and advantages of the present invention will become more readily apparent to one skilled in the art from the following detailed description when taken in conjunction with the accompanying drawing wherein:

FIGURE 1 is a side elevation partly in section of the seat with the backrest equipped with the safety belt according to a preferred form of embodiment of the present invention;

FIGURE 2 is a longitudinal section of the guide channel shown in FIGURE 1;

FIGURE 3 is a similar longitudinal sectional view of the guide channel, with the safety belt kept in substantially straight line under tension when in use;

FIGURE 4 is a perspective view of the yoke and the guide roller connected to the coiled spring shown in FIGURE 1;

FIGURE 5 is a perspective view in an enlarged scale of said yoke carrying the guide roller;

FIGURE 6 is a section of the backrest, showing means for stowage of the safety belt, wherein a spiral spring is employed instead of the coiled tension spring.

Speaking first generally, for purpose of convenience of illustration and clarity, there is illustrated only a single strip of safety belt in each figure of the accompanying drawing, but it will be understood that in practice a pair of such belts are employed for one person as practiced heretofore.

Now, referring to the drawing, the reference numerals 1 and 2 designate a seat for a vehicle and a backrest in conjunction with said seat, respectively. B is a safety belt, so-called seat belt, having at its front free end a conventional buckle 3 for adjustable connection with the end of another belt (not shown). The belt B is passed through a guide channel 4 mounted between the rear upper face of the seat 1 and the lower end of the backrest 2, and the other end of said belt B is provided with a hook 5 which is anchored to a bracket 6 rigidly mounted on a body member of the vehicle, such as for instance a vehicle floor, in the conventional manner. While in the drawing the safety belt is shown as anchored at its rear end to the floor of the vehicle at a point behind the seat and the whole length of the belt is kept in substantially a straight line when used under tension, it will be recognized that instead the rear end of the belt may be anchored to the floor at a point in front of or beneath the seat, providing a deflecting guide pulley in a conventional manner. In the case of so-called reclining seat, or in the case of seat which is mounted movable in forward and rearward directions for adjustment purpose, any means for adjusting the effective length of the belt may be provided at the point of anchoring the rear end of the belt to the body member of the vehicle, or at any point of the belt. The safety belt when in use is kept in substantially a straight line at least through the guide channel 4. The guide channel 4 has a front mouth 7 and a rear mouth 8 opening in the direction of the path of the belt B. The front mouth 7 is of such size that the passage of the buckle 3 is prevented. The channel 4 has also a larger lateral mouth 9 directed substantially at right angle to the path of the belt. The inner walls of the lateral mouth 9 are preferably rounded as shown at $a$ and $b$ (FIG. 2) to ensure a smooth sliding movement of the belt B which is pulled upwardly through the lateral mouth 9 in the manner to be described just below.

According to the present invention, there is provided means for pulling the intermediate portion of the belt B and to stow the front half portion into the idle space 2' within the backrest 2, the pulled-in portion of the belt forming a loop as shown. In the embodiment shown in FIGS. 1–5, said means comprises a coiled tension spring 10, of which one end is securely or resiliently connected to the upper frame of the backrest 2 and the other end is connected to a yoke 11 carrying a pulley or roller 12 rotatably supported (FIGS. 4 and 5). The belt B is passe through between the yoke 11 and the roller 12 as shown. Said yoke 11 together with the roller 12 constitute means for picking up the belt sidewardly. When the belt B is not in use, it is maintained stowed in the idle space 2' within the backrest 2, the intermediate portion of the belt being automatically pulled in by the action of the coiled spring 10 in the form of a loop as shown. Thus, the seat portion is completely cleared of the belt, the buckle 3 only being slightly exposed. In use, when the belt B is pulled out from the stowage space by the driver or user against the action of the spring 10, the belt will be tensioned thereby forming substantially a straight line as shown in FIG. 3.

From the foregoing description, it will be seen that according to the present invention the front half of the safety belt when not in use may be completely stowed in the idle space within the backrest, thereby keeping the seat always cleared of the belt or the container thereof, and also it will be understood that since the intermediate portion of the belt is pulled in formed into a loop, the effective stowage length of belt will be twice the length of action of the spring 10 or 20, thereby attaining a quick stowage action.

What I claim is:

In combination, a seat for a vehicle, said seat having a seat portion and having a backrest with spaced front and rear surfaces enclosing the upholstery, a safety belt having at its front end an attaching means for attaching it to a cooperating means on another safety belt and at its rear end anchored to a body member of the vehicle, a guide member mounted on the rear part of the seat portion and through which the belt passes for guiding the belt in a substantialy straight line, a second guide member associated with said first guide member and opening into said space between said spaced front and rear surfaces for guiding the intermediate portion of the belt in a direction substantially transversely to the path of the belt, takeup means in said space betwen said front and rear surfaces for engaging the belt and making a loop in the belt at the intermediate portion, and spring means in said space attached to said pickup means for pulling said loop of belt transversely through said second guide member into said space within the backrest, whereby the necessity of providing a separate container secured to the rear side of the backrest is eliminated.

References Cited
UNITED STATES PATENTS

| | | | |
|---|---|---|---|
| 2,963,080 | 12/1960 | Zang | 297—388 |
| 3,032,374 | 5/1962 | Robinson et al. | 297—388 |
| 3,107,121 | 10/1963 | Mougey | 297—388 |
| 3,128,124 | 4/1964 | Fredericks et al. | 297—388 |
| 3,164,409 | 1/1965 | Rumble | 297—388 |

CASMIR A. NUNBERG, *Primary Examiner.*